United States Patent [19]

Leather

[11] Patent Number: 4,967,672
[45] Date of Patent: Nov. 6, 1990

[54] FOLDABLE STAND

[75] Inventor: Douglas E. Leather, Keedysville, Md.

[73] Assignee: Teledyne Industries, Inc., Los Angeles, Calif.

[21] Appl. No.: 356,177

[22] Filed: May 24, 1989

[51] Int. Cl.$^5$ ............................................. A47B 3/02
[52] U.S. Cl. ...................................... 108/120; 108/147
[58] Field of Search ....................... 108/120, 146, 147; 248/164, 432, 421, 588

[56] References Cited

U.S. PATENT DOCUMENTS

| 1,121,744 | 12/1914 | McLaughlin | 108/120 X |
| 3,282,566 | 11/1966 | Clarke | 108/147 |
| 4,381,714 | 5/1983 | Henneberg et al. | 108/147 |
| 4,558,648 | 12/1985 | Franklin et al. | 108/147 |
| 4,577,821 | 3/1986 | Edmo et al. | 108/147 X |

FOREIGN PATENT DOCUMENTS

| 1333922 | 6/1962 | France | 108/147 |
| 967399 | 8/1964 | United Kingdom | 108/147 |
| 1030472 | 5/1966 | United Kingdom | 108/147 |

Primary Examiner—Peter A. Aschenbrenner
Attorney, Agent, or Firm—Niles, Kurz, Bergert & Tamburro

[57] ABSTRACT

A portable foldable stand for supporting and transporting a heavy article. The stand includes a horizontal platform supported on a foldable scissor leg mechanism and a gas spring cylinder assembly connected to the leg mechanism for assisting an operator in folding and unfolding the stand.

8 Claims, 2 Drawing Sheets

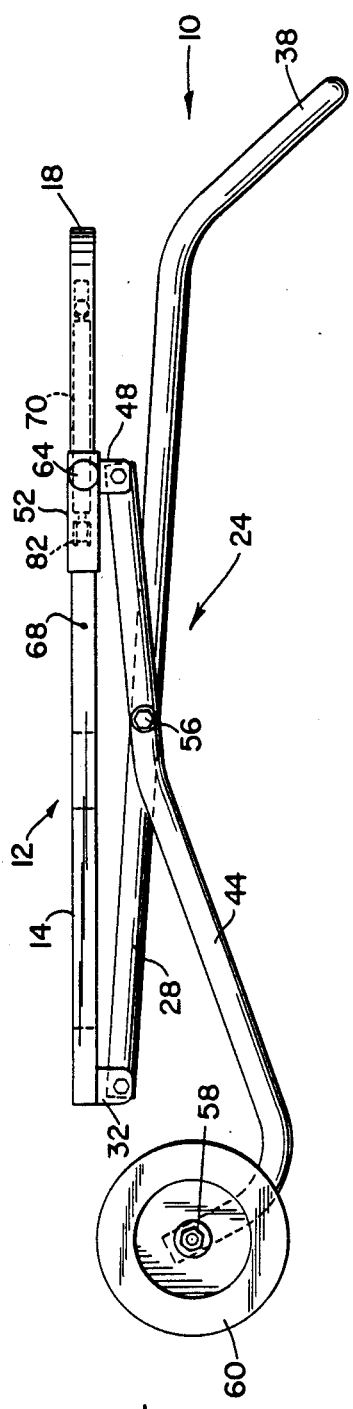
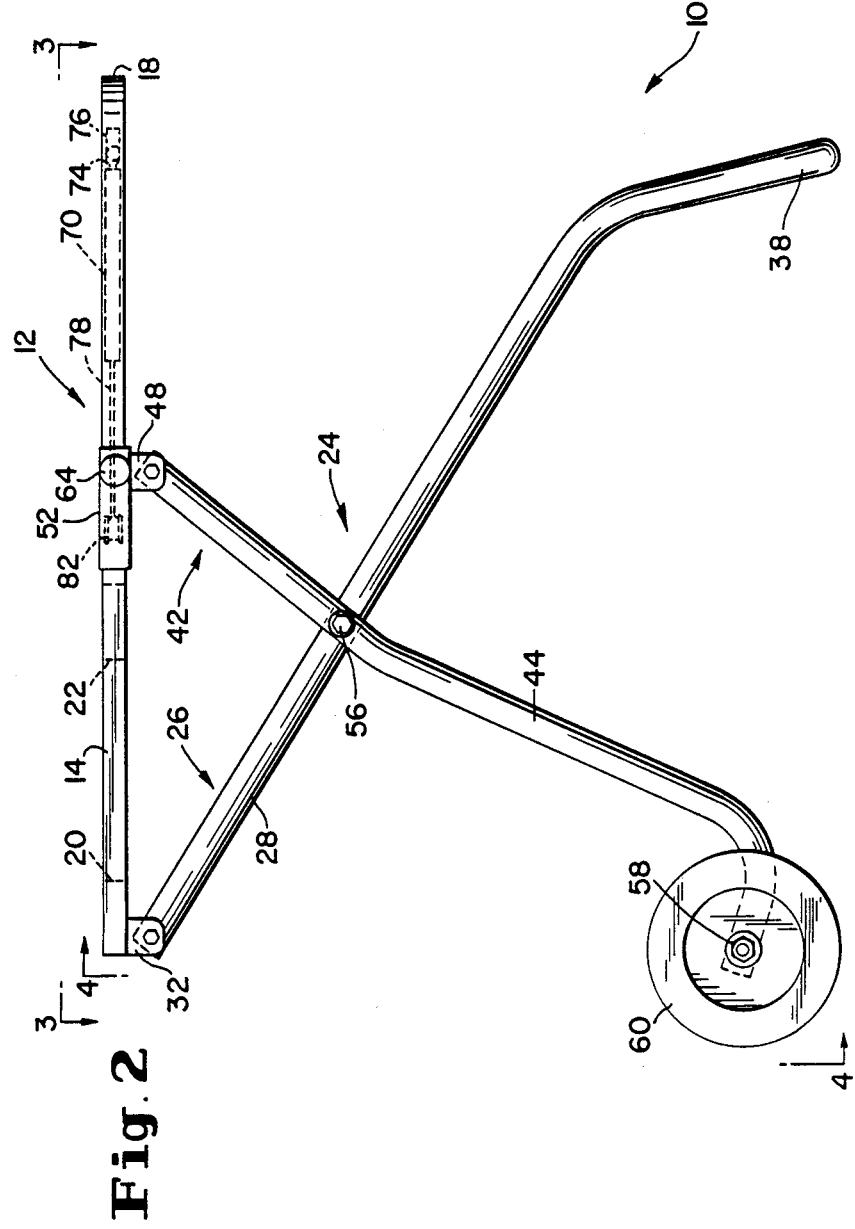
Fig. 1
Fig. 2

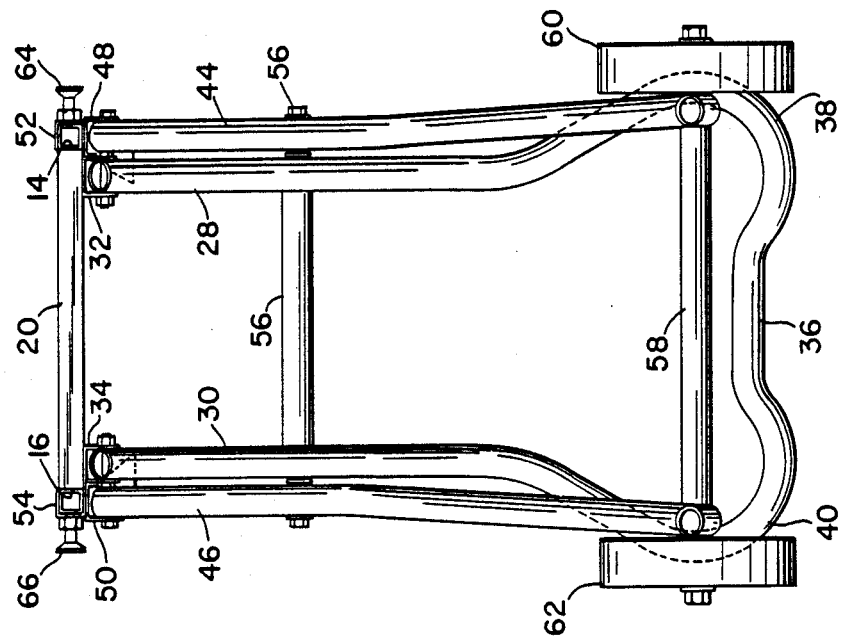
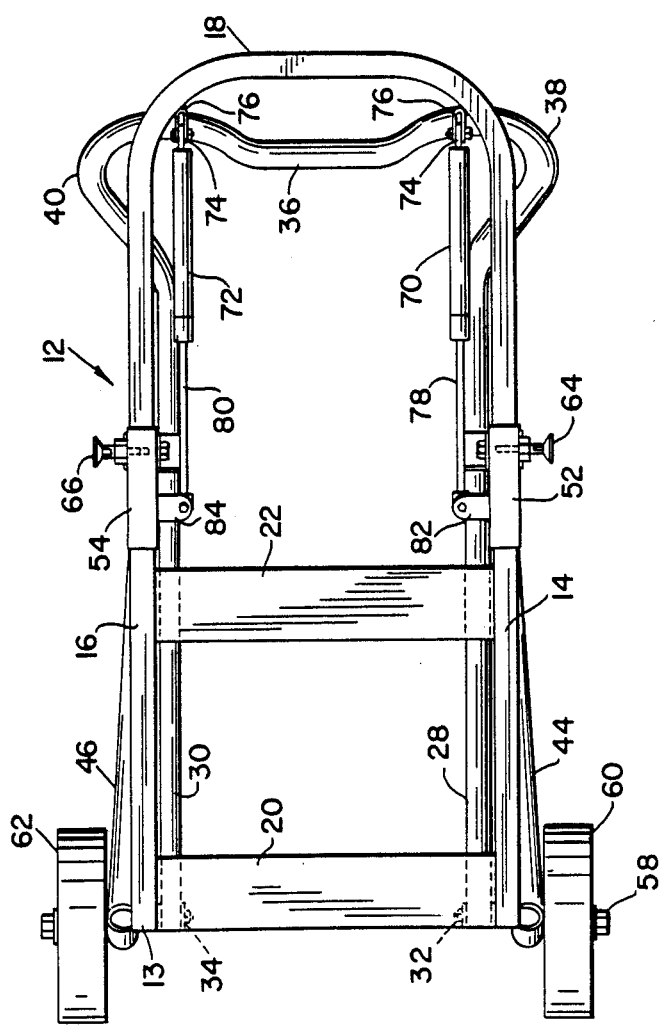

FOLDABLE STAND

BACKGROUND OF THE INVNENTION

This invention relates generally to a portable foldable stand for supporting a heavy article, more particularly to a portable foldable stand which is convenient, safe, and easy to unfold from a storage position and raise to an operating position, and then to reflold to the storage position.

While the invention may be used to support any type of article, it is particularly useful in supporting and transporting a portable pipe threading machine which is quite heavy and cumbersome to handle. Plumbers move from one job site to another, and the threading machine is liftedn on and off a truck frequently.

Collapsible carriers for such an application have been proposed in the past, as typified by the device illustrated in U.S. Pat. Nos. 4,611,823 and 4,728,118. However, these carriers employ dangerous exposed mechanical tension springs which produce abruption controlled folding and unfolding motion.

U.S. Pat. No. 4,558,648 generally discloses some advantages of using gas spring cylinders in scissor mechansim for raising and lowering a platform. However, the overall construction shown therein differs substantially from and is much more complex than this invention.

SUMMARY OF THE INVENTION

According, the primary object of this invention resides in the provision of a portable stand for supporting a heavy article, the stand being convenient, safe, and easy to adjust between a lower storage position and a raised unfolded operating position.

Another object of the invention resides in the provision of the above novel foldable stand comprising a collapsible scissor leg mechanism for raising and lowering a horizontal support platform and gas spring cylinders acting between the platform and leg mechanism to provide a force which assists an operator in raising and lowering the platform.

Still another object of the invention resides in the provision of the above novel foldable stand, wherein the gas spring cylinders are mounted in compact fashion within the planar area of the platform.

A further object of the invention resides in the provision of the above novel foldable stand wherein the gas spring cylinders provide for smooth, even, safe, controlled motion as the platform is raised and lowered.

Further objects and advantages of the invention will become apparent from the following description of the drawings.

BRIEF DESCRIPTION OF THE DRAWINGS

FIG. 1 is a side elevational view of the foldable stand as it is folded in its lowered storage position;

FIG. 2 is a side elevational view of the stand as it is unfolded to its raised operating position;

FIG. 3 is a top plan view of the stand taken along line 3—3 of FIG. 2; and

FIG. 4 is an end elevational view of the stand taken along line 4—4 of FIG. 2.

DETAILED DESCRIPTION OF THE DRAWINGS

As shown in the drawings, stand 10 is adjustable between a lower folded storage position of FIG. 1 and a raised unfolded operating position of FIG. 2.

Stand 10 includes an upper support platform 12 formed by a bent U-shaped square tubular frame 13 having laterally spaced longitudinal side members 14 and 16 connected at its rear end by lateral base member 18. A pair of longitudinally spaced metal tubular members 20 and 22 extend laterally across the open front end of frame 13 between members 14 and 16 and will include suitable fastening means, such as holes, by which a heavy article such as a pipe threading machine may be connected to and supported on the members.

A scissor leg mechanism 24 raises and lowers platform 12 and includes a first tubular leg assembly 26 having a pair of leg members 28 and 30 pivotally connected at their upper ends to brackets 32 and 34 fixed to the underside of member 20. Leg members 28 and 30 extend downwardly and rearwardly and terminate in a transverse base portion 36 having enlarged side handle sections 38 and 40 which rest on the floor. Scissor mechanism 24 includes a second leg assembly 42 having a pair of leg members 44 and 46 pivotally connected at their upper ends to slide bracket assemblies 48 and 50, respectively, which include square tubular sockets 52 and 54 which telescopically slide back and forth on the rear portion of frame members 14 and 16. Leg members 44 and 46 extend downwardly and forwardly from brackets 48 and 50, outside leg members 28 and 30 to which they are pivotally connected via transverse rod assembly 56 at their point of intersection. The lower ends of members 44 and 46 are pivotally connected to a transverse wheel axle assembly 58 on which wheels 60 and 62 are mounted for rotation.

As scissor mechanism 24 is unfolded from its lower storage position of FIG. 1 to its raised position of FIG. 2, slide members 52 and 54 slide toward the front (to the left in FIG. 1) to the position of FIG. 2 where retractable spring loaded locking pins 64 and 66 enter side holes 68 in members 14 and 16 to lock stand 10 in its raised operating position.

A pair of permanently sealed gas spring cylinders 70 and 72 are mounted within the lateral space between side members 14 and 16, with each cylinder having an eyelet 74 fixed to its base end and pivotally connected within brackets 76 which are fixed to base member 18. Piston rods 78 and 80 slide in an out of cylinders 70 and 72 and are pivotally connected at their ends to brackets 82 and 84 which are fixed on the inside faces of sockets 52 and 54.

Gas spring cylinders 70 and 72 are of conventional type and may, for example, be Gas Spring Co. FK N-11 double dampened 130 pound force gas spring cylinders. The gas in cylinders 70 and 72 is in a compressed state and rods 78 and 80 are retracted within the cylinders when the stand is in its folded storage position of FIG. 1. As the operator pulls upwardly on base member 18 to raise platform 12, the energy stored in cylinders 70 and 72 pushes rods 78 and 80 outwardly against sockets 52 and 54, and thus against the upper ends of leg members 44 and 46. The cylinders provide a substantially constant, even, horizontal force over the full travel of sockets 52 and 54 which assists the operator in unfolding scissor mechanism 24 and raising platform 12 and the heavy machine supported thereon to the operating position of FIG. 2.

Similarly when the operator releases locking pins 64 and 66 to lower platform 12 and refold mechanism 24 to the position of FIG. 1, the cylinders provide a steady dampening force which produces a smooth even folding motion.

Thus, stand 10 is convenient, safe, and easy to operate. The gas spring cylinders are mounted in compact fashion within the planar confines of the frame of the platform, and they substantially minimize the effort required by the operator to fold and unfold the stand.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A foldable stand for supporting an article comprising platform means including longitudinally extending, laterally spaced side members, a scissor mechanism having first and second diagonally intersecting leg means each having upper and lower ends, the upper end of said first leg means being pivotally connected to said platform means, a pair of slidable brackets each mounted on one of said side members and connecting the upper end of said second leg means to said side members for sliding movement therealong, said platform means being movable by said scissor mechanism between a lower folded position and a raised unfolded position, a pair of gas springs each connected between one of said side members and one of said slidable brackets and positioned laterally between said side members substantially within the planar confines of said side members, said gas springs providing a lifting force which assists movement of said platform means from said lower folded position to said raised unfolded position.

2. The foldable stand in claim 1, comprising retainer means for holding said brackets in said unfolded position.

3. The foldable stand of claim 1, siad brackets including tubular means telescopically slidably mounted on said side members.

4. The foldable stand of claim 3, comprising retainer means for holding said tubular means in said unfolded position.

5. The foldable stand of claim 3, said platform means comprising support plate means extending laterally between said side members at the other end thereof.

6. A foldable stand for supporting an article comprising platform means including a generally U-shaped frame having longitudinal side members connected at one end by a lateral base member, a scissor mechanism having first and second diagonally intersecting leg means each having upper and lower ends, the upper end of said first leg means being pivotally connected to said platform means, a pair of slidable brackets each having tubular means telescopically slidably mounted on one of said side members and connecting the upper end of said second leg means to said side members for sliding movement therealong, said platform means being movable by said scissor mechanism between a lower folded position and a raised unfolded position, gas spring means connected between said frame and said slidable brackets, said gas spring means providing a lifting force which assists movement of said platform means from said lower folded position to said raised unfolded position.

7. The foldable stand of claim 6, comprising retainer means for holding said tubular means in said unfolded position.

8. The foldable stand of claim 6, said platform means comprising support plate means extending laterally between said side members at the other end thereof.

* * * * *